UNITED STATES PATENT OFFICE.

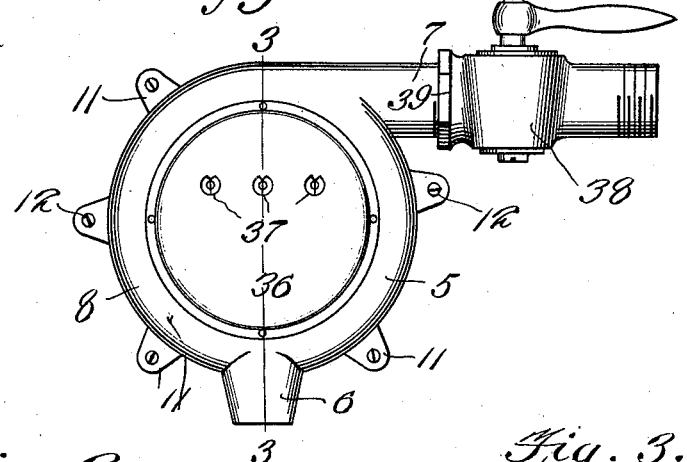
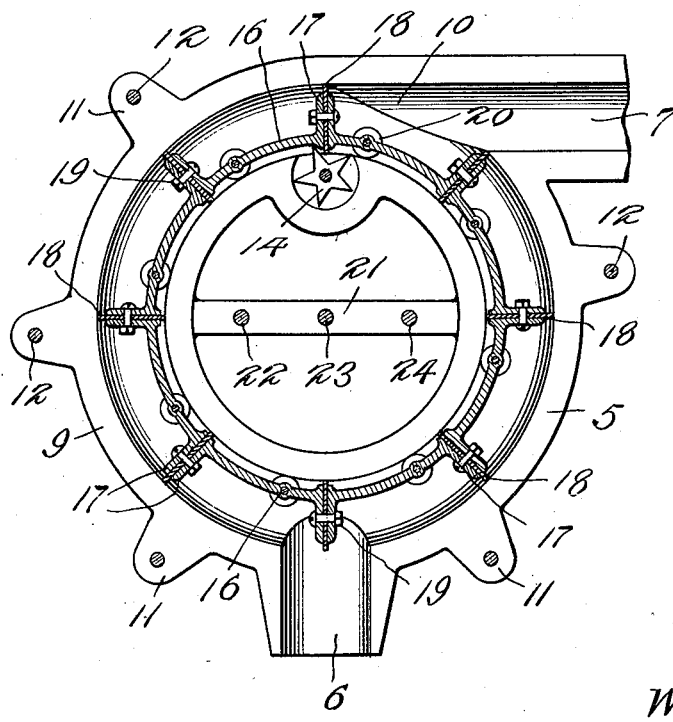
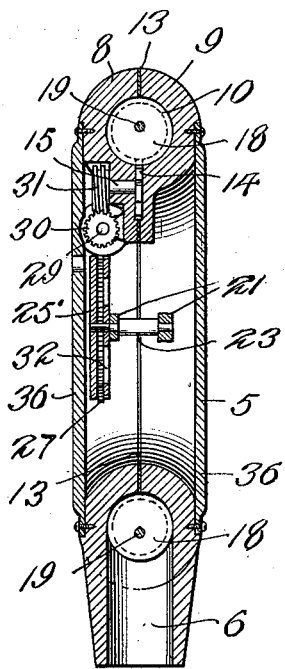

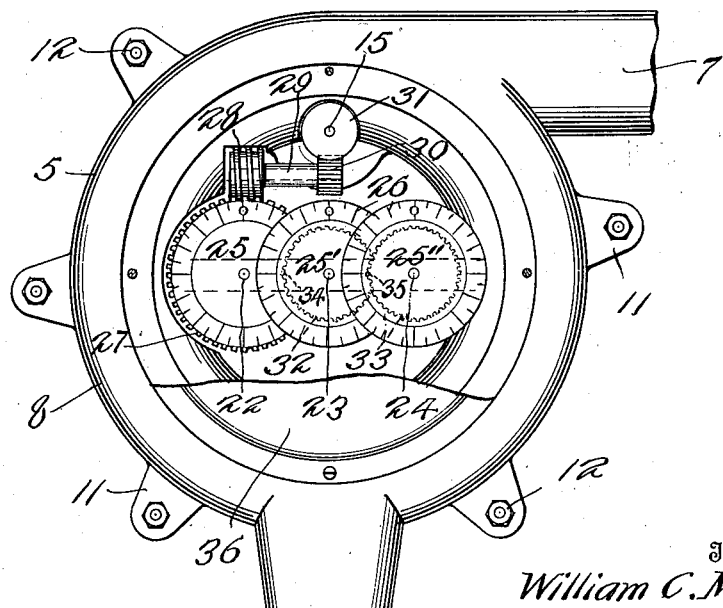

WILLIAM C. MOORE, OF SEATTLE, WASHINGTON.

FLUID-METER FAUCET.

1,008,849.  Specification of Letters Patent.  Patented Nov. 14, 1911.

Application filed December 31, 1910. Serial No. 600,342.

*To all whom it may concern:*

Be it known that I, WILLIAM C. MOORE, a citizen of the United States, residing at Seattle, in the county of King and State of Washington, have invented new and useful Improvements in Fluid-Meter Faucets, of which the following is a specification.

The invention relates to a fluid meter, and more particularly to the class of fluid meter faucets, cocks or the like.

The primary object of the invention is the provision of a meter faucet of this character in which the quantity of fluid delivered therethrough may be accurately measured and registered, thereby enabling a person to determine the amount of supply being consumed.

Another object of the invention is the provision of a fluid meter of this character in which the quantity of fluid that may be consumed can be measured and registered so as to determine the amount of fluid utilized by a user.

A further object of the invention is the provision of a meter wherein the parts thereof will be easy of operation, and that will accurately determine the quantity of fluid utilized by a consumer, without possibility of such parts being fraudulently tampered with by an unscrupulous person.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a faucet constructed in accordance with the invention. Fig. 2 is a vertical longitudinal sectional view through the same. Fig. 3 is a sectional view on the line 3—3 of Fig. 1. Fig. 4 is a top plan view partly broken away. Fig. 5 is a transverse sectional view through the faucet. Fig. 6 is a view similar to Fig. 1, with a part of the face plate broken away, showing in detail the registering mechanism.

Similar reference characters indicate corresponding parts throughout the several views of the drawings.

Referring to the drawings by numerals, 5 designates generally the faucet body or casing having the downturned outlet or discharge nozzle 6, and an inlet extension 7 at right angles thereto, the casing or body being formed of circular-shaped complementary sections 8 and 9, forming therebetween an annular duct, passage or chamber 10, with which communicates the inlet extension and outlet nozzle. These sections 8 and 9 are formed with radial perforated lugs 11 which register with each other and have passed therethrough bolt members 12 securing the said sections together. Between the inner adjacent faces of the sections are mounted resilient gaskets or washers 13 which form fluid tight joints between the sections, thus preventing any escape of liquid or other fluid when flowing through the chamber 10 in the body or casing 5 of the faucet.

Provided in the sections 8 and 9 forming the body or casing 5 of the faucet, vertically above the discharge nozzle 6, is a cavity or suitable space, in which is journaled a spur or star gear 14, the latter being fixed to a stud shaft 15, suitably journaled in the said cavity or space, so that the teeth or spurs or the wheel 14 will protrude into the fluid chamber 10 in the body or casing, for a purpose as will be hereinafter more fully described.

Mounted in the chamber 10 within the body or casing 5 of the faucet is a rotatable fluid impact member or element, comprising a plurality of rigid curved links 16, each being formed at opposite ends with circular heads 17, and between adjacent heads 17 are arranged resilient disks forming valves 18, the heads 17 being secured together by means of detachable bolts 19, which also serve to hold the valves connected between the heads of the links. Suitably journaled at opposite sides of these links and carried thereby are anti-friction rollers 20, which are adapted to travel upon the inner peripheral wall of the chamber 10, the valves 18 being acted upon by the influx of water to the chamber 10 through the inlet extension 7, thereby rotating the fluid impact element within the said chamber in the body or casing 5 of the faucet, for a purpose as will be hereinafter more fully described.

Formed transversely at the inner open center of the body or casing 5 are cross webs or bridge pieces 21 in which are journaled dial supporting spindles 22, 23 and 24, respectively, on which are fixed independent rotatable registering dials 25, 25' and 25", the latter having printed on their outer faces contiguous their peripheries suitable indicia, serving as indicator marks 26 designating the fractions of a liquid measure table, such as pints, quarts, and gallons and fractions thereof. Formed on the dial 25 fixed to the spindle 22 are cog teeth 27, the latter meshing with a worm gear 28 fixed to one end of a shaft 29, the latter having fixed thereto a pinion 30 meshing with a worm gear 31 fixed to the shaft 15 carrying the star wheel, so that upon rotation of the latter, the said dial 25 will be intermittently rotated. On the spindles 23 and 24 are cog gears 32 and 33 which are fixed to the dials 25' and 25", respectively. The dial 25 carries a pin 34 which engages the gear 32, so that the dial 25' will be intermittently rotated on the rotation of the dial 25. The dial 25' carries a pin 35 which engages the gear 33, so that the dial 25" will be intermittently rotated on the rotation of the dial 25', thus the amount of fluid passing through the chamber 10 in the faucet will be registered by the dials on the rotation thereof. Detachably secured to opposite sides of the body or casing 5 of the faucet are circular face plates 36, which serve to protect the registering mechanism from dust and dirt, and formed in one of the plates 36 are sight openings 37, through which are visible the indicia upon the registering dials, thereby enabling the same to be conveniently read for determining the quantity of liquid discharged through the faucet. Suitably mounted in an inlet extension 39 is a cut-off or turn valve 38 which controls the flow of liquid into the body of the faucet, the extension 7 of the latter being screwed into said inlet pipe 39, as shown.

In the operation of the faucet, the turning valve 38 is opened, so that fluid may flow through the inlet extension 7 into the annular chamber 10, and when the fluid enters said chamber, it causes an impact against the valves 18 in the path of the inlet, thereby rotating the fluid impact element within the chamber 10; thus on the rotation of the same, the valves will intermittently strike the spur or star wheel 14, causing it to rotate, which, in turn, will effect the rotation of the dials, thereby registering the velocity of the fluid, as it passes through the said faucet, and is discharged therefrom.

What is claimed is:

1. A faucet of the class described, comprising a casing having an annular fluid passage therein, a rotatable fluid impact element held within said passage and having spaced impact valves fixed thereon in the path of flow of fluid in the passage, registering mechanism operated upon by said valves for registering the velocity of fluid passing through said passage, and bearing elements mounted for rotation on the element and traversable on the wall of the passage.

2. A faucet of the class described, comprising a casing having an inlet and outlet, the said casing being provided with a circular passage communicating with said inlet and outlet, a star wheel rotatably supported in the casing and projecting into the circular passage therein, registering mechanism mounted in the casing and having connection with the said star wheel, and a rotatable impact element, comprising united sections having flexible valves interposed at intervals between the same and movable within said passage, the said impact element being adapted to act upon the said star wheel.

3. A faucet of the class described, comprising a casing having an inlet and outlet, the said casing being provided with a circular passage communicating with said inlet and outlet, a star wheel rotatably supported in the casing and projecting into the circular passage therein, registering mechanism mounted within the casing and having connection with the said star wheel, a rotatable impact element loosely held within said passage and adapted to act upon the said star wheel, and anti-friction rollers carried by the said element and adapted to travel upon the wall of the passage within the casing.

4. A faucet of the class described, comprising a casing, including complementary sections forming an annular channel therein, an intake extension formed on the casing and communicating with the channel, an exhaust nozzle formed on the casing and communicating with said channel at right angles to the intake extension, a train of registering dials journaled within the casing, a fluid impact element rotatably held within the channel and including spaced flexible valves closing the passage at spaced intervals therein, rotary means carried by said impact element and traversable upon the wall of the passage, a star wheel journaled within the casing and intermittently acted upon by said element, and connections between the train of dials and said star wheel.

5. A faucet of the class described, comprising a casing including complementary sections forming an annular channel therein, an intake extension formed on the casing and communicating with the channel, an exhaust nozzle formed on the casing and communicating with said channel at right angles to the intake extension, a train of registering dials journaled within the casing, a fluid impact element rotatably held within the channel, a star wheel journaled within the casing and intermittently acted upon by the said element, connections between the train of dials and the said star wheel, and face plates secured to the sections, one of said face plates being provided with sight openings for making visible the train of dials.

In testimony whereof I affix my signature in presence of two witnesses.

WILLIAM C. MOORE.

Witnesses:
 ORA L. MORRISON,
 C. M. MARTIN.